(12) United States Patent
Wong et al.

(10) Patent No.: US 10,009,436 B2
(45) Date of Patent: Jun. 26, 2018

(54) METHOD FOR PUSHING APPLICATION CONTENT AND RELATED DEVICE AND SYSTEM

(71) Applicant: Tencent Technology (Shenzhen) Company Ltd., Shenzhen (CN)

(72) Inventors: Tat Hei Wong, Shenzhen (CN); Jin Fang, Shenzhen (CN); Qian Zhang, Shenzhen (CN); Daping Yu, Shenzhen (CN); Jixing Guan, Shenzhen (CN); Jinsong Jin, Shenzhen (CN); Jun Cheng, Shenzhen (CN)

(73) Assignee: TENCENT TECHNOLOGY (SHENZHEN) COMPANY LIMITED, Shenzhen, Guangdong Province (CN)

( * ) Notice: Subject to any disclaimer, the term of this patent is extended or adjusted under 35 U.S.C. 154(b) by 0 days. days.

(21) Appl. No.: 15/316,851

(22) PCT Filed: Jun. 19, 2015

(86) PCT No.: PCT/CN2015/081949
§ 371 (c)(1),
(2) Date: Dec. 7, 2016

(87) PCT Pub. No.: WO2015/192803
PCT Pub. Date: Dec. 23, 2015

(65) Prior Publication Data
US 2017/0180500 A1    Jun. 22, 2017

(30) Foreign Application Priority Data
Jun. 19, 2014    (CN) .......................... 2014 1 0276539

(51) Int. Cl.
*G06F 15/16*    (2006.01)
*H04L 29/08*    (2006.01)

(52) U.S. Cl.
CPC .............. *H04L 67/26* (2013.01); *H04L 67/22* (2013.01)

(58) Field of Classification Search
CPC ................................ H04L 67/22; H04L 67/26
(Continued)

(56) References Cited

U.S. PATENT DOCUMENTS

2007/0260691 A1* 11/2007 Kallqvist ................ H04L 51/38
709/206
2011/0136627 A1*  6/2011 Williams ........... A63B 24/0059
482/8

(Continued)

FOREIGN PATENT DOCUMENTS

| CN | 101833877 A | 9/2010 |
|---|---|---|
| CN | 102164179 A | 8/2011 |
| EP | 2735347 A1 | 5/2014 |

OTHER PUBLICATIONS

International Search Report and Written Opinion, International Application No. PCT/CN2015/081949, dated Sep. 23, 2015.

(Continued)

*Primary Examiner* — Thuong Nguyen
(74) *Attorney, Agent, or Firm* — Morgan, Lewis & Bockius LLP (57) ABSTRACT

Embodiments of the present invention relate to the field of internet technologies, and disclose a method for pushing application content and a related device and system. A main feature of the method for pushing application content is that application content included in an application can be updated or upgraded according to an operation behavior of a user on the application.

10 Claims, 7 Drawing Sheets

(58) Field of Classification Search
USPC ..... 709/217, 206, 224; 455/554.1; 705/14.1, 705/14.45, 26.7, 14.71
See application file for complete search history.

(56) References Cited

U.S. PATENT DOCUMENTS

2012/0059874 A1    3/2012  Dodd et al.
2015/0088955 A1*  3/2015  Hendrick ................ H04L 67/10 709/201
2015/0332373 A1*  11/2015  Pang .................. G06Q 30/0631 705/26.7
2015/0348135 A1*  12/2015  Krishnamurthy .. G06Q 30/0275 705/14.71

OTHER PUBLICATIONS

Search report from European Patent Application No. 15810179.0 dated Jun. 1, 2017.
Tencent Technology, ISRWO, PCT/CN2015/081949, Sep. 25, 2015, 6 pgs.
Tencent Technology, IPRP, PCT/CN2015/081949, Dec. 20, 2016, 4 pgs.

* cited by examiner

METHOD FOR PUSHING APPLICATION CONTENT AND RELATED DEVICE AND SYSTEM

CROSS-REFERENCE TO RELATED APPLICATION

This application is a national phase of International Application PCT/CN2015/081949 filed on Jun. 19, 2015, which claims benefit of and priority to Chinese Patent Application No. 201410276539.X filed on Jun. 19, 2014 entitled "Method for Pushing Application Content and Related Device and System". The entire disclosures of each of the above applications are incorporated herein by reference.

FIELD OF THE TECHNOLOGY

The present disclosure relates to the field of internet technologies, and in particular, to a method for pushing application content and a related device and system.

BACKGROUND OF THE DISCLOSURE

With the improvement of performance of electronic devices (such as early childhood education machines), more applications can be installed in an electronic device, for example, common applications include an e-book application, a jigsaw puzzle application, a voice replay application, a synchronous course application, a children multimedia player application, and the like. It is found in practice that application content included in an application (such as an e-book included in an e-book application) in an electronic device is generally fixed, and the application content included in the application loses attractiveness after being learned, which hinders the improvement of learning interest and popularity of the electronic device.

SUMMARY

Embodiments of the present invention disclose a method for pushing application content and a related device and system, which can effectively improve attractiveness of an application and help improve learning interest and popularity of an electronic device.

A first aspect of the embodiments of the present invention discloses a method for pushing application content, including:

converting, by an electronic device, operation behaviors of a user on applications into points corresponding to the applications and storing the points;

reading, by a mobile terminal, the points that are stored in the electronic device and correspond to the applications;

detecting, by the mobile terminal, an operation by the user of selecting to upload a point corresponding to a target application among the read points corresponding to the applications;

uploading, by the mobile terminal, the point that the user selects to upload and corresponds to the target application to a first server;

adding, by the first server, the point corresponding to the target application to a stored historical accumulated point total corresponding to the target application to obtain a new accumulated point total corresponding to the target application;

sending, by the first server, a new rank that matches the new accumulated point total and corresponds to the target application to a content server;

transmitting, by the content server, application content matching the new rank corresponding to the target application to the mobile terminal; and transmitting, by the mobile terminal, the application content matching the new rank corresponding to the target application to the electronic device.

A second aspect of the embodiments of the present invention discloses another method for pushing application content, including:

converting, by an electronic device, operation behaviors of a user on applications into points corresponding to the applications and storing the points, so that a mobile terminal reads the points that are stored in the electronic device and correspond to the applications, and after the mobile terminal detects an operation by the user of selecting to upload a point corresponding to a target application among the read points corresponding to the applications, the mobile terminal uploads the point that the user selects to upload and corresponds to the target application to a first server, so that the first server adds the point corresponding to the target application to a stored historical accumulated point total corresponding to the target application to obtain a new accumulated point total corresponding to the target application, the first server sends a new rank that matches the new accumulated point total and corresponds to the target application to a content server, and the content server transmits application content matching the new rank corresponding to the target application to the mobile terminal; and receiving, by the electronic device, the application content that is transmitted by the mobile terminal and matches the new rank corresponding to the target application.

A third aspect of the embodiments of the present invention discloses another method for pushing application content, including:

reading, by a mobile terminal, points that are stored in an electronic device and correspond to applications, where the points corresponding to the applications are points that are converted from operation behaviors of a user on the applications by the electronic device and correspond to the applications;

detecting, by the mobile terminal, an operation by the user of selecting to upload a point corresponding to a target application among the read points corresponding to the applications;

uploading, by the mobile terminal, the point that the user selects to upload and corresponds to the target application to a first server, so that the first server adds the point corresponding to the target application to a stored historical accumulated point total corresponding to the target application to obtain a new accumulated point total corresponding to the target application, the first server sends a new rank that matches the new accumulated point total and corresponds to the target application to a content server, and the content server transmits application content matching the new rank corresponding to the target application to the mobile terminal; and transmitting, by the mobile terminal, the application content matching the new rank corresponding to the target application to the electronic device.

A fourth aspect of the embodiments of the present invention discloses a system for pushing application content, including:

an electronic device, configured to convert operation behaviors of a user on applications into points corresponding to the applications and store the points;

a mobile terminal, configured to read the points that are stored in the electronic device and correspond to the applications, detect an operation by the user of selecting to upload a point corresponding to a target application among the read points corresponding to the applications, and upload the point that the user selects to upload and corresponds to the target application to a first server;

the first server, configured to add the point corresponding to the target application to a stored historical accumulated point total corresponding to the target application to obtain a new accumulated point total corresponding to the target application, and send a new rank that matches the new accumulated point total and corresponds to the target application to a content server; and the content server, configured to transmit application content matching the new rank corresponding to the target application to the mobile terminal, where the mobile terminal is further configured to transmit the application content matching the new rank corresponding to the target application to the electronic device.

A fifth aspect of the embodiments of the present invention discloses an electronic device, including:

a system unit, configured to convert operation behaviors of a user on applications into points corresponding to the applications and store the points, so that a mobile terminal reads the points that are stored in the electronic device and correspond to the applications, and after the mobile terminal detects an operation by the user of selecting to upload a point corresponding to a target application among the read points corresponding to the applications, the mobile terminal uploads the point that the user selects to upload and corresponds to the target application to a first server, so that the first server adds the point corresponding to the target application to a stored historical accumulated point total corresponding to the target application to obtain a new accumulated point total corresponding to the target application, the first server sends a new rank that matches the new accumulated point total and corresponds to the target application to a content server, and the content server transmits application content matching the new rank corresponding to the target application to the mobile terminal; and a wireless unit, configured to receive the application content that is transmitted by the mobile terminal and matches the new rank corresponding to the target application.

A sixth aspect of the embodiments of the present invention discloses a mobile terminal, including:

a reading unit, configured to read points that are stored in an electronic device and correspond to applications, where the points corresponding to the applications are points that are converted from operation behaviors of a user on the applications by the electronic device and correspond to the applications;

a detection unit, configured to detect an operation by the user of selecting to upload a point corresponding to a target application among the read points corresponding to the applications; and a transmission unit, configured to upload the point that the user selects to upload and corresponds to the target application to a first server, so that the first server adds the point corresponding to the target application to a stored historical accumulated point total corresponding to the target application to obtain a new accumulated point total corresponding to the target application, the first server sends a new rank that matches the new accumulated point total and corresponds to the target application to a content server, and the content server transmits application content matching the new rank corresponding to the target application to the mobile terminal, where the transmission unit is further configured to transmit the application content matching the new rank corresponding to the target application to the electronic device.

In the embodiments of the present invention, an electronic device may convert operation behaviors of a user on applications into points corresponding to the applications and store the points; after reading the points that are stored in the electronic device and correspond to the applications, a mobile terminal may upload a point that the user selects to upload and corresponds to a target application to a first server; the first server adds the point corresponding to the target application to a stored historical accumulated point total corresponding to the target application to obtain a new accumulated point total corresponding to the target application, and sends a new rank that matches the new accumulated point total and corresponds to the target application to a content server; and the content server transmits application content matching the new rank corresponding to the target application to the mobile terminal, so that the mobile terminal transmits the application content matching the new rank corresponding to the target application to the electronic device, thereby achieving an objective of updating or upgrading application content included in an application according to an operation behavior of a user on the application; therefore, attractiveness of an application can be improved effectively, which helps improve learning interest and popularity of an electronic device.

BRIEF DESCRIPTION OF THE DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

The following clearly and completely describes the technical solutions in the embodiments of the present invention with reference to the accompanying drawings in the embodiments of the present invention. Apparently, the described embodiments are some of the embodiments of the present invention rather than all of the embodiments. All other embodiments obtained by a person of ordinary skill in the art based on the embodiments of the present invention without creative efforts shall fall within the protection scope of the present disclosure.

The embodiments of the present invention disclose a method for pushing application content and a related device and system, which can effectively improve attractiveness of an application and help improve learning interest and popularity of an electronic device. The embodiments are separately described in detail below.

Figure 1:
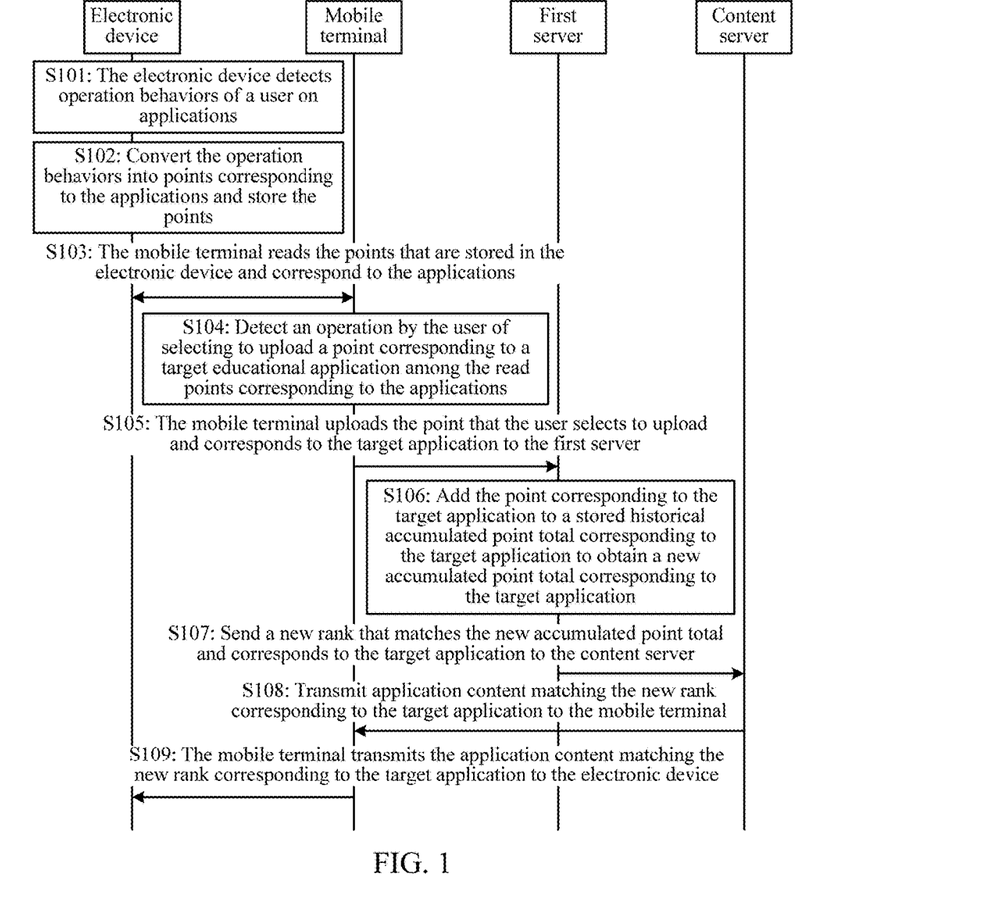
FIG. 1 is a schematic flowchart of a method for pushing application content according to an embodiment of the present invention.

Referring to FIG. 1, FIG. 1 is a schematic flowchart of a method for pushing application content according to an embodiment of the present invention. As shown in FIG. 1, the method may include the following steps:

S101: An electronic device detects operation behaviors of a user on applications.

In this embodiment of the present invention, the electronic device may include an early childhood education machine, a learning machine, a student tablet computer, or other electronic device within an application installed therein, which is not specifically limited in this embodiment of the present invention.

In this embodiment of the present invention, the operation behaviors of the user on the applications may include logging into an application by the user, time when the user logs into an application, sending a magic emoticon by the user by using an application, sending a voice message by the user by using an application, sending a text message by the user by using an application, executing application content (such a video, music, or a game) by the user by using an application, a length of time for which the user executes application content (such a video, music, or a game) by using an application, and the like, which is not specifically limited in this embodiment of the present invention.

S102: The electronic device converts the operation behaviors into points corresponding to the applications and stores the points.

In this embodiment of the present invention, an operation behavior point list may be pre-stored in the electronic device, where mapping relationships between operation behaviors on applications and points may be recorded in the operation behavior point list. In this way, the electronic device can convert, according to the mapping relationships between operation behaviors on applications and points, the operation behaviors into the points corresponding to the applications and store the points.

For example, an operation behavior point list shown in Table 1 may be pre-stored in the electronic device, where mapping relationships between operation behaviors on applications and points may be recorded in the operation behavior point list shown in Table 1. For example, the operation behavior point list shown in Table 1 may record a mapping relationship between an operation behavior "log into e-book" on an application "e-book" and a point "+2", a mapping relationship between an operation behavior "play for 5 minutes in a story-teller mode" on an application "children multimedia player" and a point "+1", a mapping relationship between an operation behavior "play online for 3 minutes" on the application "children multimedia player" and the point "+1", a mapping relationship between an operation behavior "send a magic emoticon" on an application "parent-children interaction" and the point "+1", a mapping relationship between an operation behavior "send a voice message" on the application "parent-children inter-action" and the point "+1", a mapping relationship between an operation behavior "send a text message" for the application "parent-children interaction" and the point "+1", and the like.

TABLE 1

Operation behavior point list

| Application | Operation behavior | Point | Upper limit on points per day |
|---|---|---|---|
| E-book | Log into e-book | +2 | |
| Children multimedia player | Play for 5 minutes in a story-teller mode | +1 | 30 |
| | Play online for 3 minutes | +1 | 40 |
| Parent-children interaction | Send a magic emoticon | +1 | 15 |
| | Send a voice message | +1 | 30 |
| | Send a text message | +1 | 15 |

Optionally, the operation behavior point list shown in Table 1 may record an upper limit on points per day of an operation behavior on an application, which is not limited in this embodiment of the present invention.

In this embodiment of the present invention, for example, assuming that the electronic device detects the operation behavior "log into e-book" of the user on the application "e-book", the electronic device may convert, according to the mapping relationship that is recorded in the operation behavior point list shown in Table 1 and is between the operation behavior "log into e-book" on the application "e-book" and the point "+2", the operation behavior "log into e-book" into the point "+2" corresponding to the application "e-book" and store the point "+2". For another example, assuming that the electronic device detects the operation behavior "send a magic emoticon" of the user on the application "parent-children interaction", the electronic device may convert, according to the mapping relationship that is recorded in the operation behavior point list shown in Table 1 and is between the operation behavior "send a magic emoticon" on the application "parent-children interaction" and the point "+1", the operation behavior "send a magic emoticon" into the point "+1" corresponding to the application "parent-children interaction" and store the point "+1".

S103: A mobile terminal reads the points that are stored in the electronic device and correspond to the applications.

In this embodiment of the present invention, the mobile terminal may include a smartphone, a tablet computer, a handheld computer, a mobile internet device (MID), or other user terminals, which is not specifically limited in this embodiment of the present invention.

In this embodiment of the present invention, the mobile terminal may establish a wireless connection to the electronic device by using Bluetooth or Wi-Fi or in other wireless manners, so that the mobile terminal can read, by using the wireless connection to the electronic device, the points that are stored in the electronic device and correspond to the applications.

As an optional implementation manner, the reading, by a mobile terminal, the points that are stored in the electronic device and correspond to the applications in step S103 may include the following steps:

Step (1): The mobile terminal reads application identifiers stored in the electronic device.

In this embodiment of the present invention, the application identifiers may include icons, names, and the like of the applications.

Step (2): The mobile terminal detects an instruction of the user for selecting the read application identifiers.

Step (3): The mobile terminal reads, in response to the selection instruction, the points corresponding to the applications to which the application identifiers stored in the electronic device belong.

Figure 2:
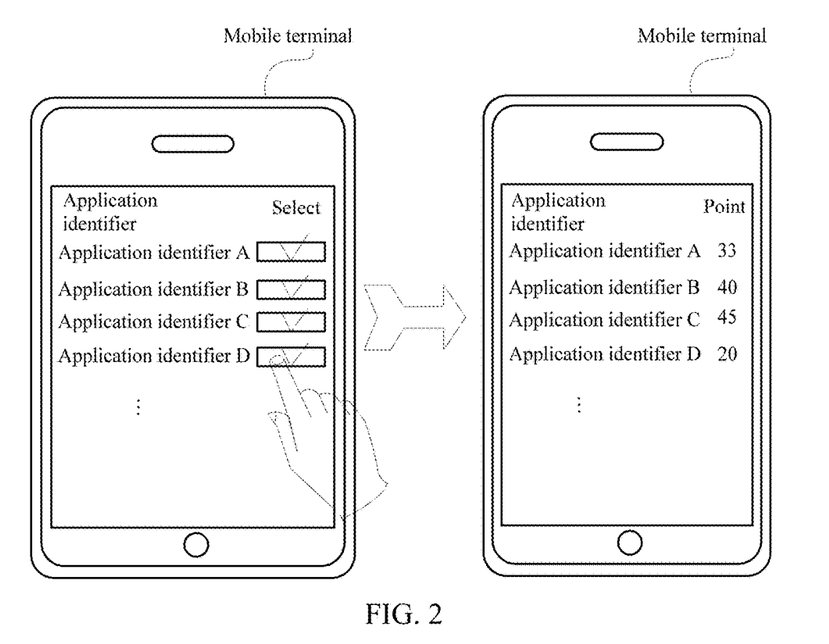
FIG. 2 is a diagram of a change in an interface of a mobile terminal according to an embodiment of the present invention.

For example, referring to FIG. 2, FIG. 2 is a diagram of a change in an interface of a mobile terminal according to an embodiment of the present invention. As can be seen from the diagram of the change in the interface of the mobile terminal shown in FIG. 2, after reading, by using the wireless connection to the electronic device, the application identifiers stored in the electronic device, the mobile terminal may output the read application identifiers A to D stored in the electronic device; when the mobile terminal detects an instruction of the user for selecting the read application identifiers A to D (ticks indicate that the identifiers are already selected), the mobile terminal may read, in response to the selection instruction, points (which are 33, 40, 45, and 20) corresponding to applications to which the application identifiers A to D stored in the electronic device belong.

In this embodiment of the present invention, by performing the foregoing step (1) to step (3), the user of the mobile terminal can select to obtain points that are stored in the electronic device and correspond to some applications as desired. In this way, the points that are stored in the electronic device and correspond to the applications can be obtained according to individual needs.

S104: The mobile terminal detects an operation by the user of selecting to upload a point corresponding to a target application among the read points corresponding to the applications.

S105: The mobile terminal uploads the point that the user selects to upload and corresponds to the target application to a first server.

In this embodiment of the present invention, the first server may include a cloud server.

Figure 3:
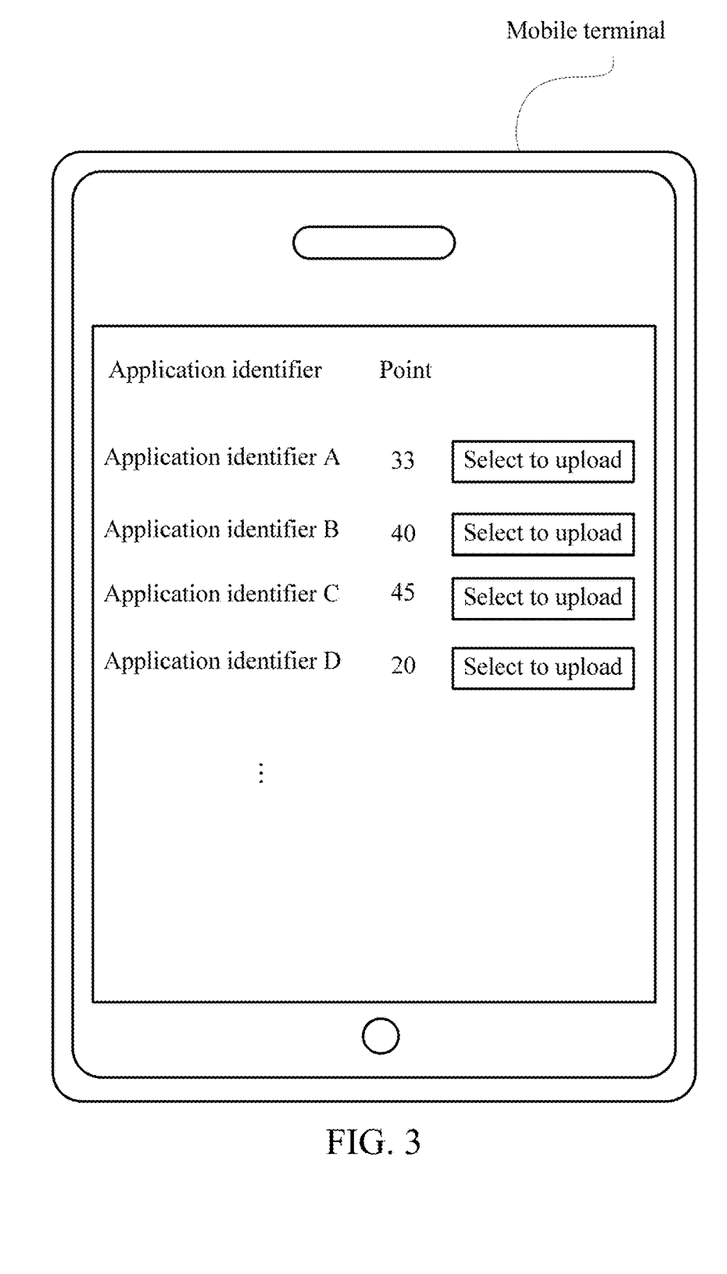
FIG. 3 is a diagram of an interface of a mobile terminal according to an embodiment of the present invention.

For example, referring to FIG. 3, FIG. 3 is a diagram of an interface of a mobile terminal according to an embodiment of the present invention. As can be seen from the diagram of the interface of the mobile terminal shown in FIG. 3, the mobile terminal may output the read points (which are 33, 40, 45, and 20) corresponding to the applications to which the application identifiers A to D stored in the electronic device belong, and may detect an operation by the user of selecting to upload a point corresponding to a target application among the read points corresponding to the applications. For example, when the user performs an operation of selecting to upload a point of a target application to which the application identifier A belongs among the read points corresponding to the applications, the mobile terminal may upload the point, which the user selects to upload, of the target application to which the application identifier A belongs to the first server.

In this embodiment of the present invention, the user of the mobile terminal can select to upload points that are stored in the electronic device and correspond to some target applications to the first server as desired. In this way, application content that is stored in the electronic device and corresponds to the target applications can be updated or upgraded according to individual needs.

S106: The first server adds the point corresponding to the target application to a stored historical accumulated point total corresponding to the target application to obtain a new accumulated point total corresponding to the target application.

In this embodiment of the present invention, after obtaining the new accumulated point total corresponding to the target application, the first server may update the stored historical accumulated point total corresponding to the target application by using the new accumulated point total corresponding to the target application.

S107: The first server determines whether a new rank that matches the new accumulated point total and corresponds to the target application is higher than a current rank that matches the historical accumulated point total and corresponds to the target application, and sends the new rank that matches the new accumulated point total and corresponds to the target application to a content server if the new rank is higher than the current rank.

In this embodiment of the present invention, a target application rank point list shown in Table 2 may be prestored in the first server, where mapping relationships between ranks of the target application and points may be recorded in the target application rank point list shown in Table 2. For example, assuming that the stored historical accumulated point total corresponding to the target application is 290 and the current rank that matches the historical accumulated point total 290 and corresponds to the target application is 2, and assuming that the new accumulated point total that is obtained by the first server and corresponds to the target application in the foregoing step S106 is 398 and the new rank that matches the new accumulated point total 398 and corresponds to the target application is 3, the first server can determine that the new rank 3 that matches the new accumulated point total 398 and corresponds to the target application is higher than the current rank 2 that matches the historical accumulated point total 290 and corresponds to the target application, and the first server may send the new rank 3 that matches the new accumulated point total 398 and corresponds to the target application to the content server.

TABLE 2

| Target application rank point list | | | | |
|---|---|---|---|---|
| Rank | Point total required by each rank | Point required to rise to a next rank | The total number of growth days required by each rank | The number of days required to rise to a next rank |
| 1 | 0 | +132 | | +1 day |
| 2 | 132 | +264 | 1 day | +2 days |
| 3 | 396 | +528 | 3 days | +4 days |
| 4 | 924 | +1056 | 7 days | +8 days |
| 5 | 1980 | +1980 | 15 days | +15 days |
| 6 | 3960 | +3960 | 30 days | +30 days |
| 7 | 7920 | +5280 | 60 days | +40 days |
| 8 | 13200 | +13200 | 100 days | +100 days |
| 9 | 26400 | +26400 | 200 days | +200 days |
| 10 | 52800 | | 400 days | |

Optionally, in this embodiment of the present invention, the total number of growth days required by each rank of the target application and the number of days required to rise to a next rank may be further recorded in the target application rank point list shown in Table 2, which is not limited in this embodiment of the present invention.

In this embodiment of the present invention, when the first server determines that the new rank that matches the new accumulated point total and corresponds to the target application is equal to the current rank that matches the historical accumulated point total and corresponds to the target application, the first server does not need to send the new rank that matches the new accumulated point total and corresponds to the target application to the content server; and in this case, the first server may transmit prompt information to the mobile terminal, where the prompt information is used to indicate that application content of the target application does not satisfy an updating or upgrading condition for the moment.

In an embodiment, in the method described in FIG. 1, after step S106 is performed, step S107 may be ignored, and step S108 is directly performed, which is not limited in this embodiment of the present invention.

S108: The content server transmits application content matching the new rank corresponding to the target application to the mobile terminal.

In this embodiment of the present invention, after receiving the new rank that is sent by the first server and matches the new accumulated point total and corresponds to the target application, the content server may automatically unlock application content matching the new rank corresponding to the target application, generate an XML-format document according to the application content matching the new rank corresponding to the target application, and transmit the XML-format document to the mobile terminal.

In this embodiment of the present invention, the content server may include a content management module and a content generation module, where the content management module is configured to upload application content (such as music, a video, an e-book, or a game) included in a target application and released by a supplier, and add a tag field such as a type tag, a rank tag, or a recommendation tag to application content included in each target application, and the content generation module is configured to unlock application content matching a new rank corresponding to a target application, generate an XML-format document according to the application content matching the new rank corresponding to the target application, and transmit the XML-format document to the mobile terminal.

S109: The mobile terminal transmits the application content matching the new rank corresponding to the target application to the electronic device.

In this embodiment of the present invention, a manner for transmitting the application content matching the new rank corresponding to the target application to the electronic device by the mobile terminal in the foregoing step S109 may include the following steps:

Step (a): The mobile terminal outputs prompt information, where the prompt information is used to indicate whether the application content matching the new rank corresponding to the target application is to be transmitted to the electronic device.

Step (b): The mobile terminal detects a transmission confirmation instruction, which is input by the user in response to the prompt information, and transmits the application content matching the new rank corresponding to the target application to the electronic device.

In this embodiment of the present invention, by performing the foregoing step (a) and step (b), the user of the mobile terminal can learn, in real time, information about the progress of updating or upgrading of the application content included in the target application of the electronic device.

In this embodiment of the present invention, the application content that is transmitted by the content server to the mobile terminal and matches the new rank corresponding to the target application in the foregoing step S108 is merely a part of entire application content matching the new rank corresponding to the target application, and a length of the application content that is transmitted by the content server to the mobile terminal and matches the new rank corresponding to the target application is less than or equal to a memory length of the mobile terminal; therefore, the method described in FIG. 1 may further include the following steps:

Step A: The content server transmits remaining application content, which includes the entire application content matching the new rank corresponding to the target application except the application content transmitted to the mobile terminal, to the first server.

Step B: The first server transmits the remaining application content to the electronic device by using a wireless connection to the electronic device.

In this embodiment of the present invention, the first server may establish a wireless connection to the electronic device by using Wi-Fi or in other wireless manners, so that the first server can transmit the remaining application content to the electronic device by using the wireless connection to the electronic device.

In this embodiment of the present invention, when a length of the entire application content matching the new rank corresponding to the target application is greater than the memory length of the mobile terminal, if the content server directly transmits the entire application content matching the new rank corresponding to the target application to the mobile terminal, loss of the application content may be caused, or even worse, a breakdown of the mobile terminal may be caused because an entire memory is used. Therefore, when the length of the entire application content matching the new rank corresponding to the target application is greater than the memory length of the mobile terminal, the content server may transmit the remaining application content, which includes the entire application content matching the new rank corresponding to the target application except the application content transmitted to the mobile terminal, to the first server, and the first server transmits the remaining application content to the electronic device by using the wireless connection to the electronic device. In this way, not only is it ensured that the length of the application content that is transmitted by the content server to the mobile terminal and matches the new rank corresponding to the target application is less than or equal to the memory length of the mobile terminal, but it is also ensured that the electronic device can receive the entire application content matching the new rank corresponding to the target application.

In the method described in FIG. 1, an objective of updating or upgrading application content included in an application according to an operation behavior of a user on the application can be achieved; therefore, attractiveness of an application can be improved effectively, which helps improve learning interest and popularity of an electronic device.

Figure 4:
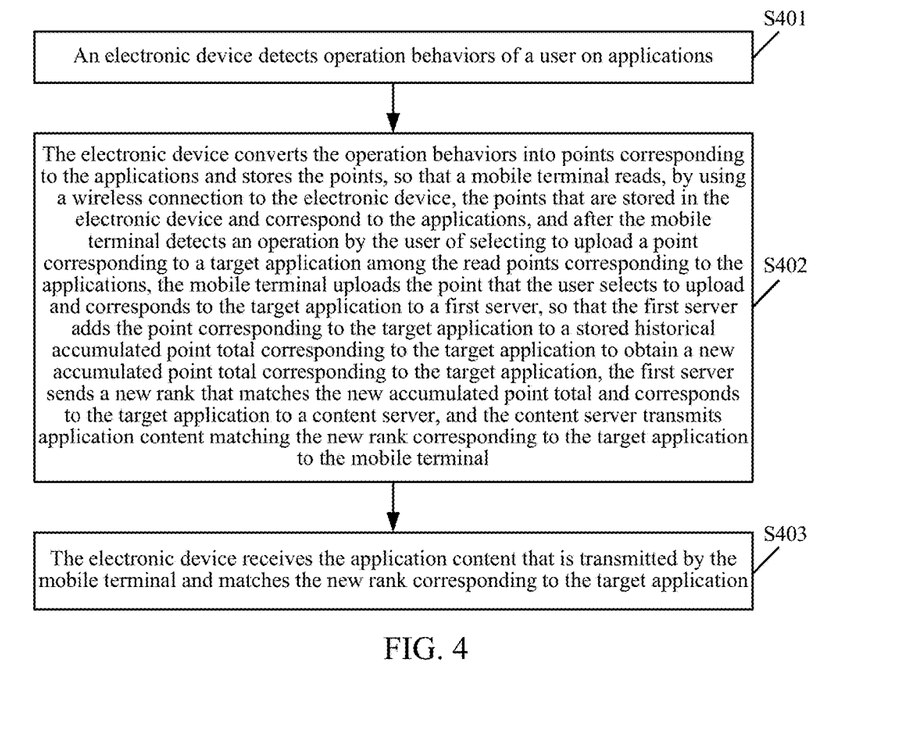
FIG. 4 is a schematic flowchart of another method for pushing application content according to an embodiment of the present invention.

Referring to FIG. 4, FIG. 4 is a schematic flowchart of another method for pushing application content according to an embodiment of the present invention. As shown in FIG. 4, the method may include the following steps:

S401: An electronic device detects operation behaviors of a user on applications.

In this embodiment of the present invention, the operation behaviors of the user on the applications may include logging into an application by the user, time when the user logs into an application, sending a magic emoticon by the user by using an application, sending a voice message by the user by using an application, sending a text message by the user by using an application, executing application content (such a video, music, or a game) by the user by using an application, a length of time for which the user executes application content (such a video, music, or a game) by using an application, and the like, which is not specifically limited in this embodiment of the present invention.

S402: The electronic device converts the operation behaviors into points corresponding to the applications and stores the points, so that a mobile terminal reads, by using a wireless connection to the electronic device, the points that are stored in the electronic device and correspond to the applications, and after the mobile terminal detects an operation by the user of selecting to upload a point corresponding to a target application among the read points corresponding to the applications, the mobile terminal uploads the point that the user selects to upload and corresponds to the target application to a first server, so that the first server adds the point corresponding to the target application to a stored historical accumulated point total corresponding to the target application to obtain a new accumulated point total corresponding to the target application, the first server sends a new rank that matches the new accumulated point total and corresponds to the target application to a content server, and the content server transmits application content matching the new rank corresponding to the target application to the mobile terminal.

In this embodiment of the present invention, after the first server adds the point corresponding to the target application to the stored historical accumulated point total corresponding to the target application to obtain the new accumulated point total corresponding to the target application and before the first server sends the new rank that matches the new accumulated point total and corresponds to the target application to the content server, the first server may determine whether the new rank that matches the new accumulated point total and corresponds to the target application is higher than a current rank that matches the historical accumulated point total and corresponds to the target application, and perform the step of sending a new rank that matches the new accumulated point total and corresponds to the target application to a content server if the new rank is higher than the current rank.

S403: The electronic device receives the application content that is transmitted by the mobile terminal and matches the new rank corresponding to the target application.

In this embodiment of the present invention, an operation behavior point list may be pre-stored in the electronic device, where mapping relationships between operation behaviors on applications and points may be recorded in the operation behavior point list. In this way, the electronic device can convert, according to the mapping relationships between operation behaviors on applications and points, the operation behaviors into the points corresponding to the applications and store the points.

In this embodiment of the present invention, the application content that is transmitted by the content server to the mobile terminal and matches the new rank corresponding to the target application is merely a part of entire application content matching the new rank corresponding to the target application, and a length of the application content that is transmitted by the content server to the mobile terminal and matches the new rank corresponding to the target application is less than or equal to a memory length of the mobile terminal; therefore, the method described in FIG. 4 may further include the following step:

receiving, by the electronic device, remaining application content, which is sent by the first server and includes entire application content matching the new rank corresponding to the target application except the application content transmitted to by the content server the mobile terminal, where the remaining application content is transmitted by the content server to the first server.

In this embodiment of the present invention, when a length of the entire application content matching the new rank corresponding to the target application is greater than the memory length of the mobile terminal, if the content server directly transmits the entire application content matching the new rank corresponding to the target application to the mobile terminal, loss of the application content may be caused, or even worse, a breakdown of the mobile terminal may be caused because an entire memory is used. Therefore, when the length of the entire application content matching the new rank corresponding to the target application is greater than the memory length of the mobile terminal, the content server may transmit the remaining application content, which includes the entire application content matching the new rank corresponding to the target application except the application content transmitted to the mobile terminal, to the first server, and the first server transmits the remaining application content to the electronic device by using a wireless connection to the electronic device. In this way, not only is it ensured that the length of the application content that is transmitted by the content server to the mobile terminal and matches the new rank corresponding to the target application is less than or equal to the memory length of the mobile terminal, but it is also ensured that the electronic device can receive the entire application content matching the new rank corresponding to the target application.

In the method described in FIG. 4, an objective of updating or upgrading application content included in an application according to an operation behavior of a user on the application can be achieved; therefore, attractiveness of an application can be improved effectively, which helps improve learning interest and popularity of an electronic device.

Figure 5:
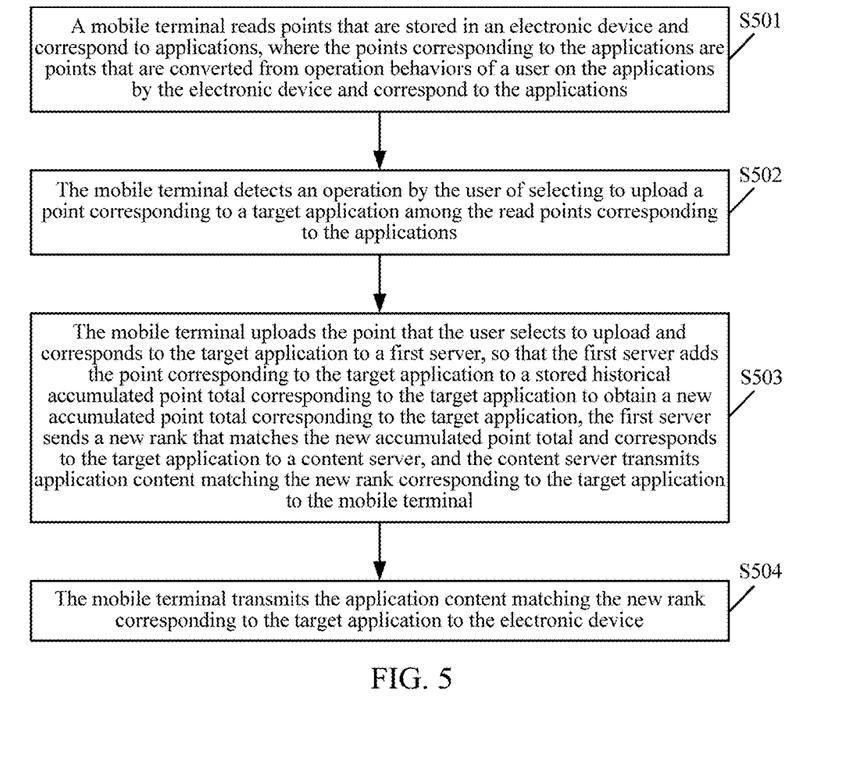
FIG. 5 is a schematic flowchart of another method for pushing application content according to an embodiment of the present invention.

Referring to FIG. 5, FIG. 5 is a schematic flowchart of another method for pushing application content according to an embodiment of the present invention. As shown in FIG. 5, the method may include the following steps:

S501: A mobile terminal reads points that are stored in an electronic device and correspond to applications, where the points corresponding to the applications are points that are converted from operation behaviors of a user on the applications by the electronic device and correspond to the applications.

As an optional implementation manner, the reading, by a mobile terminal, points that are stored in an electronic device and correspond to applications in step S501 may include the following steps:

Step (1): The mobile terminal reads application identifiers stored in the electronic device.

In this embodiment of the present invention, the application identifiers may include icons, names, and the like of the applications.

Step (2): The mobile terminal detects an instruction of the user for selecting the read application identifiers.

Step (3): The mobile terminal reads, in response to the selection instruction, the points corresponding to the applications to which the application identifiers stored in the electronic device belong.

In this embodiment of the present invention, by performing the foregoing step (1) to step (3), the user of the mobile terminal can select to obtain points that are stored in the electronic device and correspond to some applications as desired. In this way, the points that are stored in the electronic device and correspond to the applications can be obtained according to individual needs.

S502: The mobile terminal detects an operation by the user of selecting to upload a point corresponding to a target application among the read points corresponding to the applications.

S503: The mobile terminal uploads the point that the user selects to upload and corresponds to the target application to a first server, so that the first server adds the point corresponding to the target application to a stored historical accumulated point total corresponding to the target application to obtain a new accumulated point total corresponding to the target application, the first server sends a new rank that matches the new accumulated point total and corresponds to the target application to a content server, and the content server transmits application content matching the new rank corresponding to the target application to the mobile terminal.

In this embodiment of the present invention, after the first server adds the point corresponding to the target application to the stored historical accumulated point total corresponding to the target application to obtain the new accumulated point total corresponding to the target application and before the first server sends the new rank that matches the new accumulated point total and corresponds to the target application to the content server, the first server may further determine whether the new rank that matches the new accumulated point total and corresponds to the target application is higher than a current rank that matches the historical accumulated point total and corresponds to the target application, and perform the step of sending a new rank that matches the new accumulated point total and corresponds to the target application to a content server if the new rank is higher than the current rank.

S504: The mobile terminal transmits the application content matching the new rank corresponding to the target application to the electronic device.

In this embodiment of the present invention, a manner for transmitting the application content matching the new rank corresponding to the target application to the electronic device by the mobile terminal in the foregoing step S504 may include the following steps:

Step (a): The mobile terminal outputs prompt information, where the prompt information is used to indicate whether the application content matching the new rank corresponding to the target application is to be transmitted to the electronic device.

Step (b): The mobile terminal detects a transmission confirmation instruction, which is input by the user in response to the prompt information, and transmits the application content matching the new rank corresponding to the target application to the electronic device.

In this embodiment of the present invention, by performing the foregoing step (a) and step (b), the user of the mobile terminal can learn, in real time, information about the progress of updating or upgrading of the application content included in the target application of the electronic device.

In the method described in FIG. 5, an objective of updating or upgrading application content included in an application according to an operation behavior of a user on the application can be achieved; therefore, attractiveness of an application can be improved effectively, which helps improve learning interest and popularity of an educational electronic device.

Figure 6:
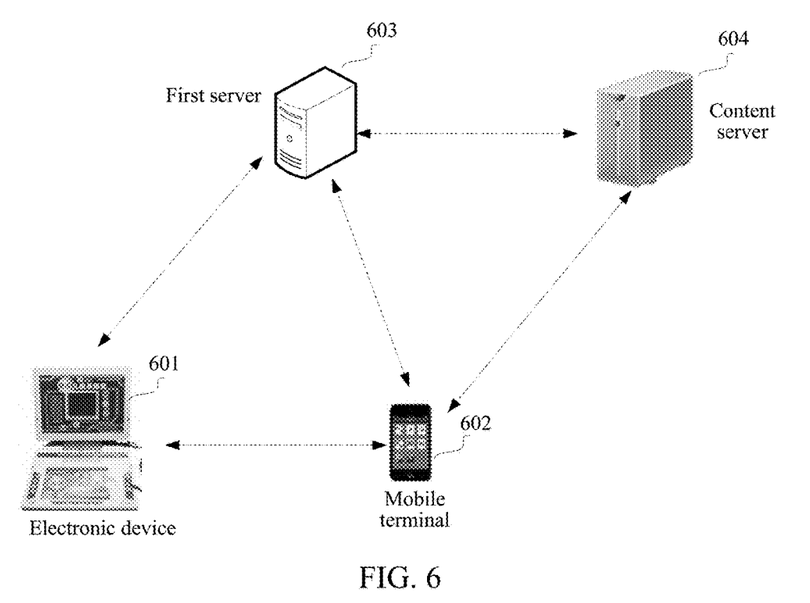
FIG. 6 is a schematic structural diagram of a system for pushing application content according to an embodiment of the present invention.

Referring to FIG. 6, FIG. 6 is a schematic structural diagram of a system for pushing application content according to an embodiment of the present invention. As shown in FIG. 6, the system may include:

an electronic device 601, configured to detect operation behaviors of a user on applications, and convert the operation behaviors into points corresponding to the applications and store the points;

a mobile terminal 602, configured to read, by using a wireless connection (for example, Bluetooth) to the electronic device 601, the points that are stored in the electronic device 601 and correspond to the applications, detect an operation by the user of selecting to upload a point corresponding to a target application among the read points corresponding to the applications, and upload the point that the user selects to upload and corresponds to the target application to a first server 603;

the first server 603, configured to add the point corresponding to the target application to a stored historical accumulated point total corresponding to the target application to obtain a new accumulated point total corresponding to the target application, and send a new rank that matches the new accumulated point total and corresponds to the target application to a content server 604, where further, after adding the point corresponding to the target application to the stored historical accumulated point total corresponding to the target application to obtain the new accumulated point total corresponding to the target application and before sending the new rank that matches the new accumulated point total and corresponds to the target application to the content server 604, the first server 603 may determine whether the new rank that matches the new accumulated point total and corresponds to the target application is higher than a current rank that matches the historical accumulated point total and corresponds to the target application, and perform the step of sending a new rank that matches the new accumulated point total and corresponds to the target application to a content server 604 if the new rank is higher than the current rank, and the content server 604, configured to transmit application content matching the new rank corresponding to the target application to the mobile terminal 602, where the mobile terminal 602 is further configured to transmit the application content matching the new rank corresponding to the target application to the electronic device.

In this embodiment of the present invention, a manner for converting the operation behaviors into the points corresponding to the applications and storing the points by the electronic device 601 may be specifically that:

the electronic device 601 is configured to convert, according to mapping relationships between operation behaviors on applications and points, the operation behaviors into the points corresponding to the applications and store the points.

In this embodiment of the present invention, a manner for reading, by using the wireless connection to the electronic device 601, the points that are stored in the electronic device 601 and correspond to the applications by the mobile terminal 602 may be specifically that:

the mobile terminal 602 is configured to read, by using the wireless connection to the electronic device 601, application identifiers stored in the electronic device 601, detect an instruction of the user for selecting the read application identifiers, and read, in response to the selection instruction, the points corresponding to the applications to which the application identifiers stored in the electronic device belong.

In this embodiment of the present invention, the application content that is transmitted by the content server 604 to the mobile terminal 602 and matches the new rank corresponding to the target application is merely a part of entire application content matching the new rank corresponding to the target application, and a length of the application content that is transmitted by the content server 604 to the mobile terminal 602 and matches the new rank corresponding to the target application is less than or equal to a memory length of the mobile terminal 602; therefore, the content server 604 is further configured to transmit remaining application content, which includes the entire application content matching the new rank corresponding to the target application except the application content transmitted to the mobile terminal 602, to the first server 603; and correspondingly, the first server 603 is further configured to transmit the remaining application content to the electronic device 601 by using a wireless connection (for example, Wi-Fi) to the electronic device 601.

In this embodiment of the present invention, a manner for transmitting the application content matching the new rank corresponding to the target application to the electronic device by the mobile terminal 602 may be specifically that:

the mobile terminal 602 is configured to output prompt information, where the prompt information is used to indicate whether the application content matching the new rank corresponding to the target application is to be transmitted to the electronic device 601, detect a transmission confirmation instruction, which is input by the user in response to the prompt information, and transmit the application content matching the new rank corresponding to the target application to the electronic device 601.

In the system described in FIG. 6, an objective of updating or upgrading application content included in an application according to an operation behavior of a user on the application can be achieved; therefore, attractiveness of an application can be improved effectively, which helps improve learning interest and popularity of an educational electronic device.

Figure 7:
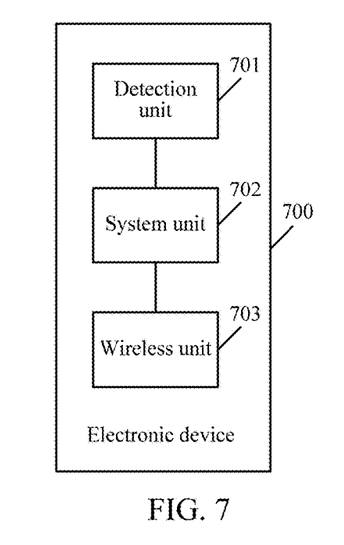
FIG. 7 is a schematic structural diagram of an electronic device according to an embodiment of the present invention.

Referring to FIG. 7, FIG. 7 is a schematic structural diagram of an electronic device according to an embodiment of the present invention. As shown in FIG. 7, the electronic device 700 may include:

a detection unit 701, configured to detect operation behaviors of a user on applications;

a system unit 702, configured to convert the operation behaviors into points corresponding to the applications and store the points, so that a mobile terminal reads, by using a wireless connection to the electronic device 700, the points that are stored in the electronic device 700 and correspond to the applications, and after the mobile terminal detects an operation by the user of selecting to upload a point corresponding to a target application among the read points corresponding to the applications, the mobile terminal uploads the point that the user selects to upload and corresponds to the target application to a first server, so that the first server adds the point corresponding to the target application to a stored historical accumulated point total corresponding to the target application to obtain a new accumulated point total corresponding to the target application, the first server sends a new rank that matches the new accumulated point total and corresponds to the target application to a content server, and the content server transmits application content matching the new rank corresponding to the target application to the mobile terminal, where further, after the first server adds the point corresponding to the target application to the stored historical accumulated point total corresponding to the target application to obtain the new accumulated point total corresponding to the target application and before the first server sends the new rank that matches the new accumulated point total and corresponds to the target application to the content server, the first server may first determine whether the new rank that matches the new accumulated point total and corresponds to the target application is higher than a current rank that matches the historical accumulated point total and corresponds to the target application, and perform the step of sending a new rank that matches the new accumulated point total and corresponds to the target application to a content server if the new rank is higher than the current rank; and a wireless unit 703, configured to receive the application content that is transmitted by the mobile terminal and matches the new rank corresponding to the target application.

In this embodiment of the present invention, application content included in applications may be stored in the system unit 702, and correspondingly, after receiving the application content that is transmitted by the mobile terminal and matches the new rank corresponding to the target application, the wireless unit 703 may store the application content matching the new rank corresponding to the target application in the system unit 702.

In this embodiment of the present invention, the system unit 702 is configured to convert, according to mapping relationships between operation behaviors on applications and points, the operation behaviors into the points corresponding to the applications and store the points.

In this embodiment of the present invention, the application content that is transmitted by the content server to the mobile terminal and matches the new rank corresponding to the target application is merely a part of entire application content matching the new rank corresponding to the target application, and a length of the application content that is transmitted by the content server to the mobile terminal and matches the new rank corresponding to the target application is less than or equal to a memory length of the mobile terminal; therefore, correspondingly, the wireless unit 703 is further configured to receive remaining application content, which is sent by the first server and includes the entire application content matching the new rank corresponding to the target application except the application content transmitted to the mobile terminal, where the remaining application content is transmitted by the content server to the first server.

In this embodiment of the present invention, when a length of the entire application content matching the new rank corresponding to the target application is greater than the memory length of the mobile terminal, if the content server directly transmits the entire application content matching the new rank corresponding to the target application to the mobile terminal, loss of the application content may be caused, or even worse, a breakdown of the mobile terminal may be caused because an entire memory is used. Therefore, when the length of the entire application content matching the new rank corresponding to the target application is greater than the memory length of the mobile terminal, the content server may transmit the remaining application content, which includes the entire application content matching the new rank corresponding to the target application except the application content transmitted to the mobile terminal, to the first server, and the first server transmits the remaining application content to the electronic device by using a wireless connection to the electronic device. In this way, not only is it ensured that the length of the application content that is transmitted by the content server to the mobile terminal and matches the new rank corresponding to the target application is less than or equal to the memory length of the mobile terminal, but it is also ensured that the electronic device can receive the entire application content matching the new rank corresponding to the target application.

In this embodiment of the present invention, by using the electronic device described in FIG. 7, an objective of updating or upgrading application content included in an application according to an operation behavior of a user on the application can be achieved; therefore, attractiveness of an application can be improved effectively, which helps improve learning interest and popularity of an educational electronic device.

Figure 8:
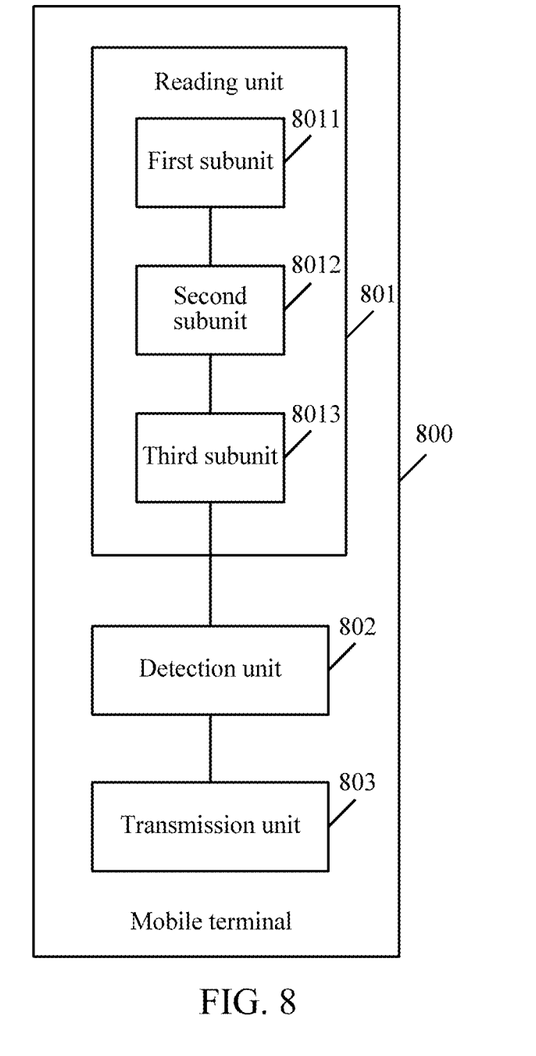
FIG. 8 is a schematic structural diagram of a mobile terminal according to an embodiment of the present invention.

Referring to FIG. 8, FIG. 8 is a schematic structural diagram of a mobile terminal according to an embodiment of the present invention. As shown in FIG. 8, the mobile terminal 800 may include:

a reading unit 801, configured to read, by using a wireless connection to an electronic device, points that are stored in the electronic device and correspond to applications, where the points corresponding to the applications are points that are converted from operation behaviors of a user on the applications by the electronic device and correspond to the applications;

a detection unit 802, configured to detect an operation by the user of selecting to upload a point corresponding to a target application among the read points corresponding to the applications; and a transmission unit 803, configured to upload the point that the user selects to upload and corresponds to the target application to a first server, so that the first server adds the point corresponding to the target application to a stored historical accumulated point total corresponding to the target application to obtain a new accumulated point total corresponding to the target application, the first server sends a new rank that matches the new accumulated point total and corresponds to the target application to a content server, and the content server transmits application content matching the new rank corresponding to the target application to the mobile terminal.

Further, after the first server adds the point corresponding to the target application to the stored historical accumulated point total corresponding to the target application to obtain the new accumulated point total corresponding to the target application and before the first server sends the new rank that matches the new accumulated point total and corresponds to the target application to the content server, the first server may determine whether the new rank that matches the new accumulated point total and corresponds to the target application is higher than a current rank that matches the historical accumulated point total and corresponds to the target application, and perform the step of sending a new rank that matches the new accumulated point total and corresponds to the target application to a content server if the new rank is higher than the current rank; and correspondingly, the transmission unit 803 is further configured to transmit the application content matching the new rank corresponding to the target application to the electronic device.

In this embodiment of the present invention, the reading unit 801 may include:

a first subunit 8011, configured to read, by using the wireless connection to the electronic device, application identifiers stored in the electronic device;

a second subunit 8012, configured to detect an instruction of the user for selecting the read application identifiers; and a third subunit 8013, configured to read, in response to the selection instruction, the points corresponding to the applications to which the application identifiers stored in the electronic device belong.

In this embodiment of the present invention, a manner for transmitting the application content matching the new rank corresponding to the target application to the electronic device by the transmission unit 803 may be specifically that:

the transmission unit 803 outputs prompt information, where the prompt information is used to indicate whether the application content matching the new rank corresponding to the target application is to be transmitted to the electronic device, detects a transmission confirmation instruction, which is input by the user in response to the prompt information, and transmits the application content matching the new rank corresponding to the target application to the electronic device.

In this embodiment of the present invention, by using the mobile terminal described in FIG. 8, an objective of updating or upgrading application content included in an application according to an operation behavior of a user on the application can be achieved; therefore, attractiveness of an application can be improved effectively, which helps improve learning interest and popularity of an educational electronic device.

A person of ordinary skill in the art may understand that all or some of the steps of the methods in the foregoing embodiments may be implemented by a program instructing relevant hardware. The program may be stored in a computer-readable storage medium. The storage medium may include: a flash disk, a read-only memory (ROM), a random access memory (RAM), a magnetic disk, or an optical disc.

The method for pushing application content and the related device and system provided by the embodiments of the present invention are described above in detail. The principle and implementation manners of the present disclosure are described in this specification by using specific examples, but the foregoing descriptions of the embodiments are merely intended to help understand the method of the present disclosure and the core idea thereof. Besides, a person of ordinary skill in the art may make alterations to the specific implementation manners and application scope according to the idea of the present disclosure. In conclusion, the content of this specification shall not be understood as a limitation on the present invention.

What is claimed is:

1. A method for pushing application content, the method comprising:

converting, by an electronic device, operation behaviors of a user on applications into points of the user corresponding to the applications according to a present mapping relationship between operation behaviors and points and storing the points of the user corresponding to the applications;

reading, by a mobile terminal, accumulated point totals of the user which are totals of points of the user corresponding to respective applications that are stored in the electronic device;

detecting, by the mobile terminal, an operation by the user of selecting to upload an accumulated point total of the user corresponding to a target application among the read accumulated point totals of the points of the user corresponding to the respective applications;

uploading, by the mobile terminal, the accumulated point total of the user corresponding to the target application that the user selects to upload to a first server;

adding, by the first server, the accumulated point total of the user corresponding to the target application to a stored historical accumulated point total of the user corresponding to the target application to obtain a new accumulated point total of the user corresponding to the target application;

sending, by the first server, a new rank corresponding to the target application that matches the new accumulated point total of the user to a content server;

determining, by the content server, that a length of application content matching the new rank corresponding to the target application is greater than a memory length of the mobile terminal, wherein the application content is content provided by the target application;

transmitting, by the content server, a portion of the application content matching the new rank corresponding to the target application that is less than or equal to the memory length of the mobile terminal to the mobile terminal;

transmitting, by the content server, remaining application content which comprises the entire application content matching the new rank corresponding to the target application except the portion of the application content transmitted to the mobile terminal, to the first server;

transmitting, by the mobile terminal, the portion of the application content matching the new rank corresponding to the target application that is less than or equal to the memory length of the mobile terminal to the electronic device; and transmitting, by the first server, the remaining application content to the electronic device via a separate wireless connection.

2. The method according to claim 1, wherein before the converting, by an electronic device, operation behaviors of a user on applications into points of the user corresponding to the applications according to a present mapping relationship between operation behaviors and points and storing the points of the user corresponding to the applications, the method further comprises:

detecting, by the electronic device, the operation behaviors of the user on the applications.

3. The method according to claim 2, wherein after the adding, by the first server, the accumulated point total of the user corresponding to the target application to a stored historical accumulated point total of the user corresponding to the target application to obtain a new accumulated point total of the user corresponding to the target application and before the sending, by the first server, a new rank corresponding to the target application that matches the new accumulated point total of the user to a content server, the method further comprises:

determining, by the first server, whether the new rank corresponding to the target application that matches the new accumulated point total of the user is higher than a current rank corresponding to the target application that matches the historical accumulated point total of the user, and performing the step of sending a new rank corresponding to the target application that matches the new accumulated point total of the user to a content server in response to determining that the new rank is higher than the current rank.

4. The method according to claim 3, wherein the reading, by a mobile terminal, accumulated point totals of points of the user corresponding to respective applications that are stored in the electronic device comprises:

reading, by the mobile terminal, application identifiers stored in the electronic device;

detecting, by the mobile terminal, an instruction of the user for selecting the read application identifiers; and reading, by the mobile terminal in response to the selection instruction, the accumulated point totals of points of the user corresponding to the respective applications to which the application identifiers stored in the electronic device belong.

5. The method according to claim 1, wherein the transmitting, by the mobile terminal, a portion of the application content matching the new rank corresponding to the target application to the electronic device comprises:

outputting, by the mobile terminal, prompt information, wherein the prompt information is used to indicate whether the application content matching the new rank corresponding to the target application is to be transmitted to the electronic device; and detecting, by the mobile terminal, a transmission confirmation instruction, which is input by the user in response to the prompt information, and transmitting the application content matching the new rank corresponding to the target application to the electronic device.

6. A method for pushing application content, the method comprising:

converting, by an electronic device, operation behaviors of a user on applications into points of the user corresponding to the applications according to a preset mapping relationship between operation behaviors and points and storing the points of the user corresponding to the applications, so that a mobile terminal reads accumulated point totals of points of the user corresponding to respective applications that are stored in the electronic device, and after the mobile terminal detects an operation by the user of selecting to upload an accumulated point total of the user corresponding to a target application among the read accumulated point totals of the points of the user corresponding to the applications, the mobile terminal uploads the accumulated point total of the user corresponding to the target application that the user selects to upload to a first server, so that the first server adds the accumulated point total of the user corresponding to the target application to a stored historical accumulated point total of the user corresponding to the target application to obtain a new accumulated point total of the user corresponding to the target application, the first server sends a new rank corresponding to the target application that matches the new accumulated point total of the user to a content server, and the content server determines that a length of application content matching the new rank corresponding to the target application is greater than a memory length of the mobile terminal, wherein the application content is content provided by the target application, transmits a portion of the application content matching the new rank corresponding to the target application that is less than or equal to the memory length of the mobile terminal to the mobile terminal, and transmits remaining application content which comprises the entire application content matching the new rank corresponding to the target application except the portion of the application content transmitted to the mobile terminal, to the first server; and receiving, by the electronic device, the portion of the application content that is transmitted by the mobile terminal and matches the new rank corresponding to the target application and the remaining application content that is transmitted by the first server and comprises entire application content matching the new rank corresponding to the target application except the application content transmitted to by the content server the mobile terminal via a separate wireless connection, respectively.

7. The method according to claim 6, wherein before the converting, by an electronic device, operation behaviors of a user on applications into points of the user corresponding to the applications according to a present mapping relationship between operation behaviors and points and storing the points of the user corresponding to the applications, the method further comprises:

detecting, by the electronic device, the operation behaviors of the user on the applications.

8. A method for pushing application content, the method comprising:

reading, by a mobile terminal, accumulated point totals of a user corresponding to respective applications that are stored in an electronic device, wherein the accumulated point totals of the user corresponding to the respective applications are totals of points of the user corresponding to the respective applications that are converted from operation behaviors of the user on the respective applications by the electronic device;

detecting, by the mobile terminal, an operation by the user of selecting to upload an accumulated point total of the user corresponding to a target application among the read accumulated point totals of the points of the user corresponding to the respective applications;

uploading, by the mobile terminal, the accumulated point total of the user corresponding to the target application that the user selects to upload to a first server, so that the first server adds the accumulated point total of the user corresponding to the target application to a stored historical accumulated point total of the user corresponding to the target application to obtain a new accumulated point total of the user corresponding to the target application, the first server sends a new rank corresponding to the target application that matches the new accumulated point total of the user to a content server, and the content server determines that a length of application content matching the new rank corresponding to the target application is greater than a memory length of the mobile terminal, wherein the application content is content provided by the target application, transmits a portion of the application content matching the new rank corresponding to the target application that is less than or equal to the memory length of the mobile terminal to the mobile terminal and transmits remaining application content which comprises the entire application content matching the new rank corresponding to the target application except the portion of the application content transmitted to the mobile terminal, to the first server; and transmitting, by the mobile terminal, the portion of the application content matching the new rank corresponding to the target application to the electronic device, wherein the electronic device receives the remaining application content that comprises entire application content matching the new rank corresponding to the target application except the application content transmitted to by the content server the mobile terminal transmitted by the first server via a separate wireless connection.

9. The method according to claim 8, wherein the reading, by a mobile terminal, accumulated point totals of a user corresponding to respective applications that are stored in an electronic device comprises:

reading, by the mobile terminal, application identifiers stored in the electronic device;

detecting, by the mobile terminal, an instruction of the user for selecting the read application identifiers; and reading, by the mobile terminal in response to the selection instruction, the accumulated point totals of points of the user corresponding to the respective applications to which the application identifiers stored in the electronic device belong.

10. The method according to claim 8, wherein the transmitting, by the mobile terminal, the application content matching the new rank corresponding to the target application to the electronic device comprises:

outputting, by the mobile terminal, prompt information, wherein the prompt information is used to indicate whether the application content matching the new rank corresponding to the target application is to be transmitted to the electronic device; and detecting, by the mobile terminal, a transmission confirmation instruction, which is input by the user in response to the prompt information, and transmitting the application content matching the new rank corresponding to the target application to the electronic device.

\* \* \* \* \*